(12) United States Patent
Livingston

(10) Patent No.: US 6,693,720 B1
(45) Date of Patent: Feb. 17, 2004

(54) METHOD AND APPARATUS FOR INTEGRATING PRINT JOB STATUS INFORMATION AND USER OPTIONS WITH IMPLICIT JOB INTERRUPTION

(75) Inventor: Kris R. Livingston, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/430,402

(22) Filed: Oct. 29, 1999

(51) Int. Cl.[7] ............................................... G01K 15/00
(52) U.S. Cl. ....................................... 358/1.15; 358/1.13
(58) Field of Search ........................... 358/1.1, 1.2, 1.6, 358/1.13, 1.14, 1.15, 537, 452; 399/9, 11, 75, 81, 82, 85, 87; 345/700; 715/526, 527, 528, 529, 530

(56) References Cited

U.S. PATENT DOCUMENTS 4,639,881 A    1/1987  Zingher 6,469,796 B1 * 10/2002  Leiman et al. ............. 358/1.15

FOREIGN PATENT DOCUMENTS

EP    0803795 A1   10/1997   ............. G06F/3/12
EP    0889390 A1    1/1999   ............. G06F/3/12

* cited by examiner

Primary Examiner—Arthur G. Evans

(57) ABSTRACT

A computer implemented printer control system includes memory configured to provide an operating system and operative to store files representing at least one document to be printed and a display configured to provide an image of a graphical user interface in a viewing window. The graphical user interface is configured to allow user selection and modification of print engine options for printing the document. The control system also includes processing circuitry configured to display, in the graphical user interface, a list of user-selectable printing features including a status feature, with the status feature selected, in response to a command to execute a print job and display a current status of the print job together with the list.

17 Claims, 4 Drawing Sheets

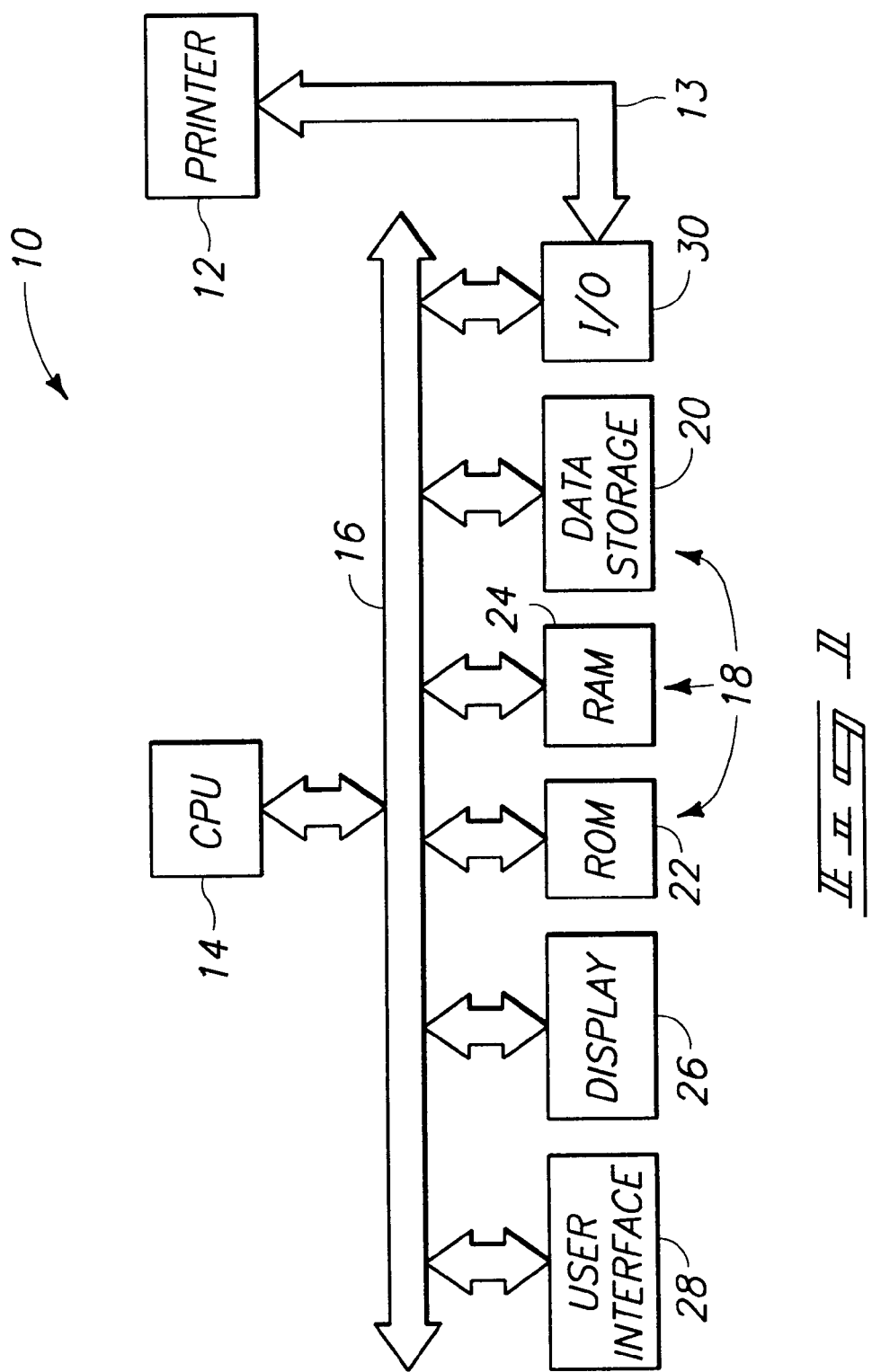

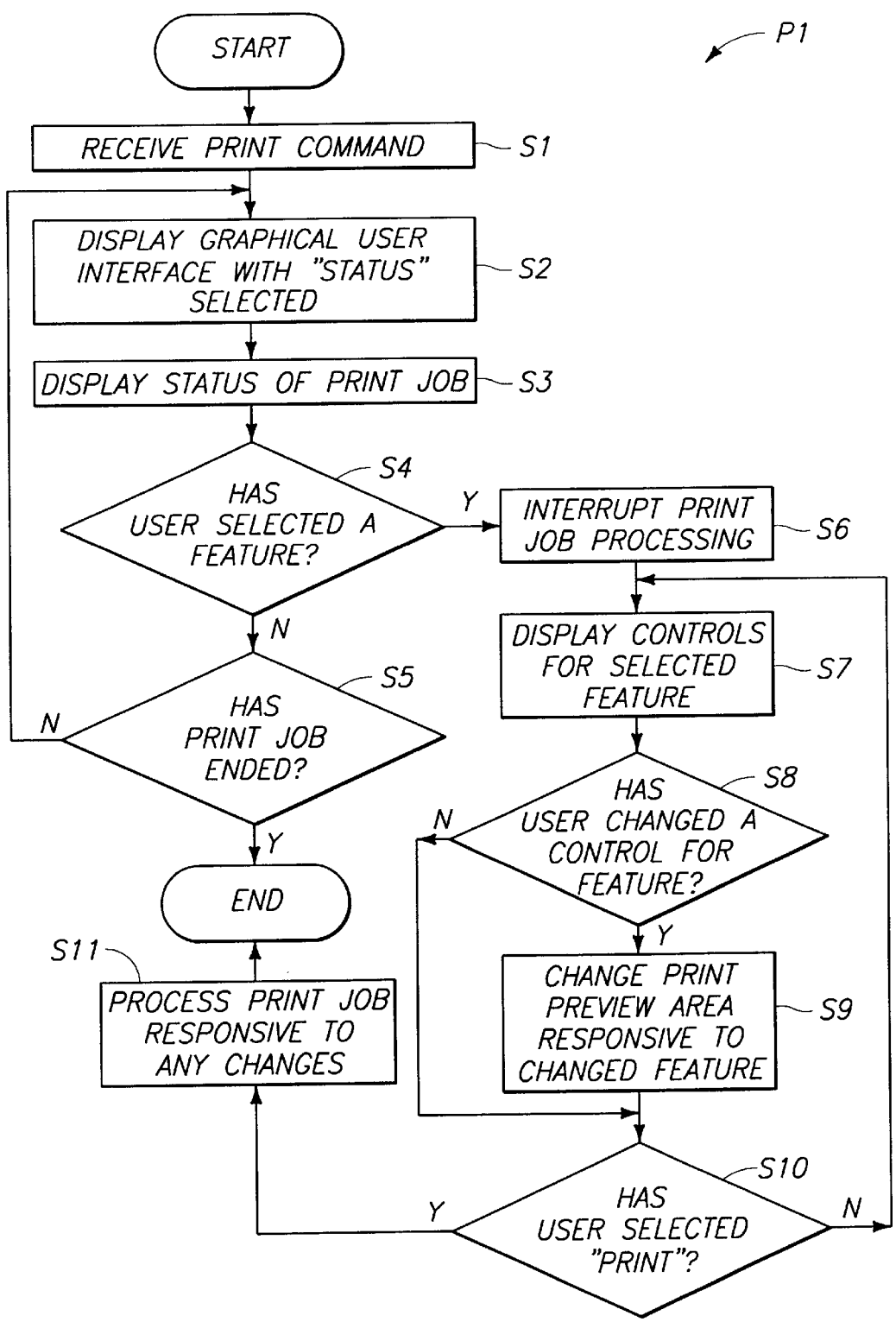

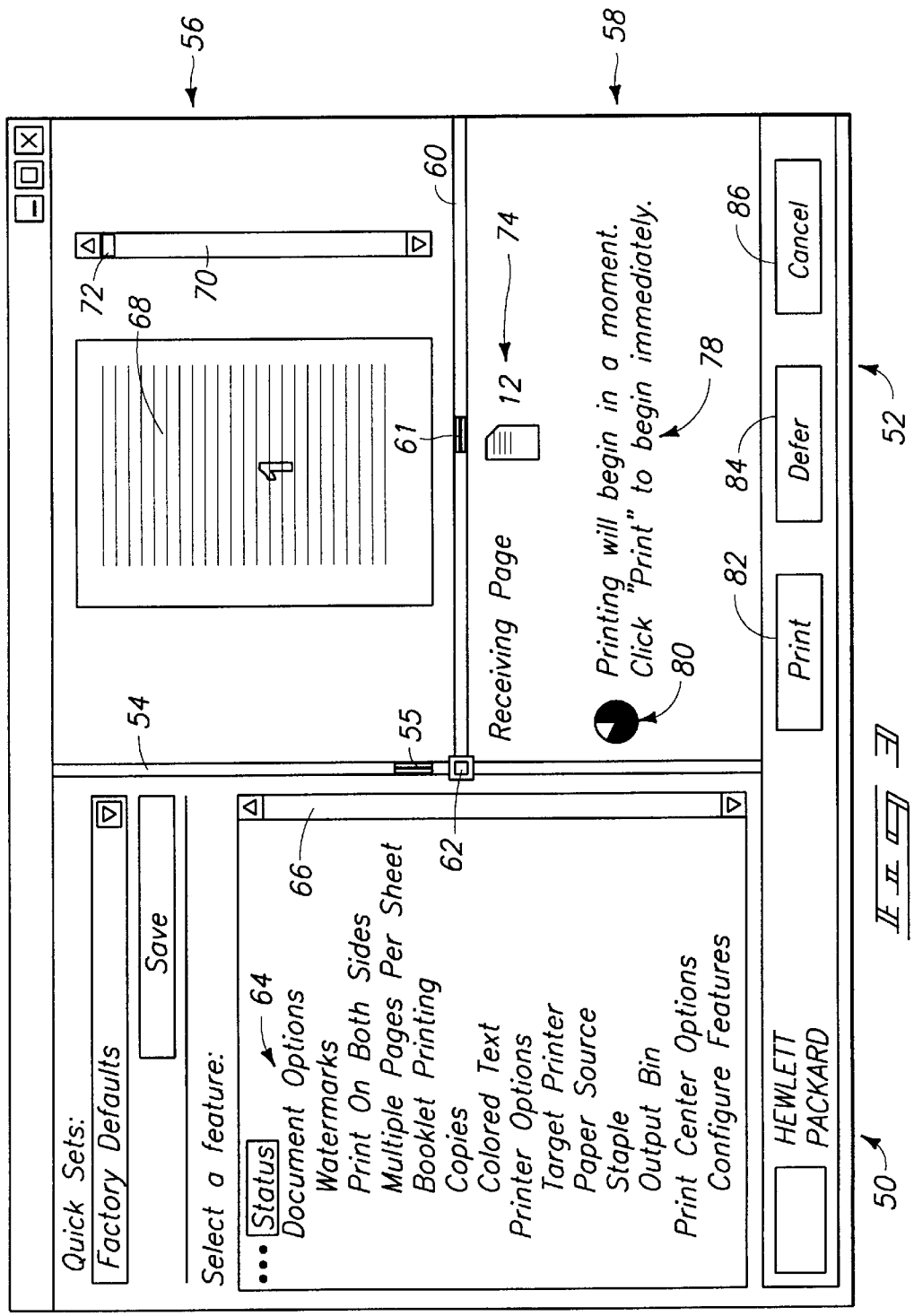

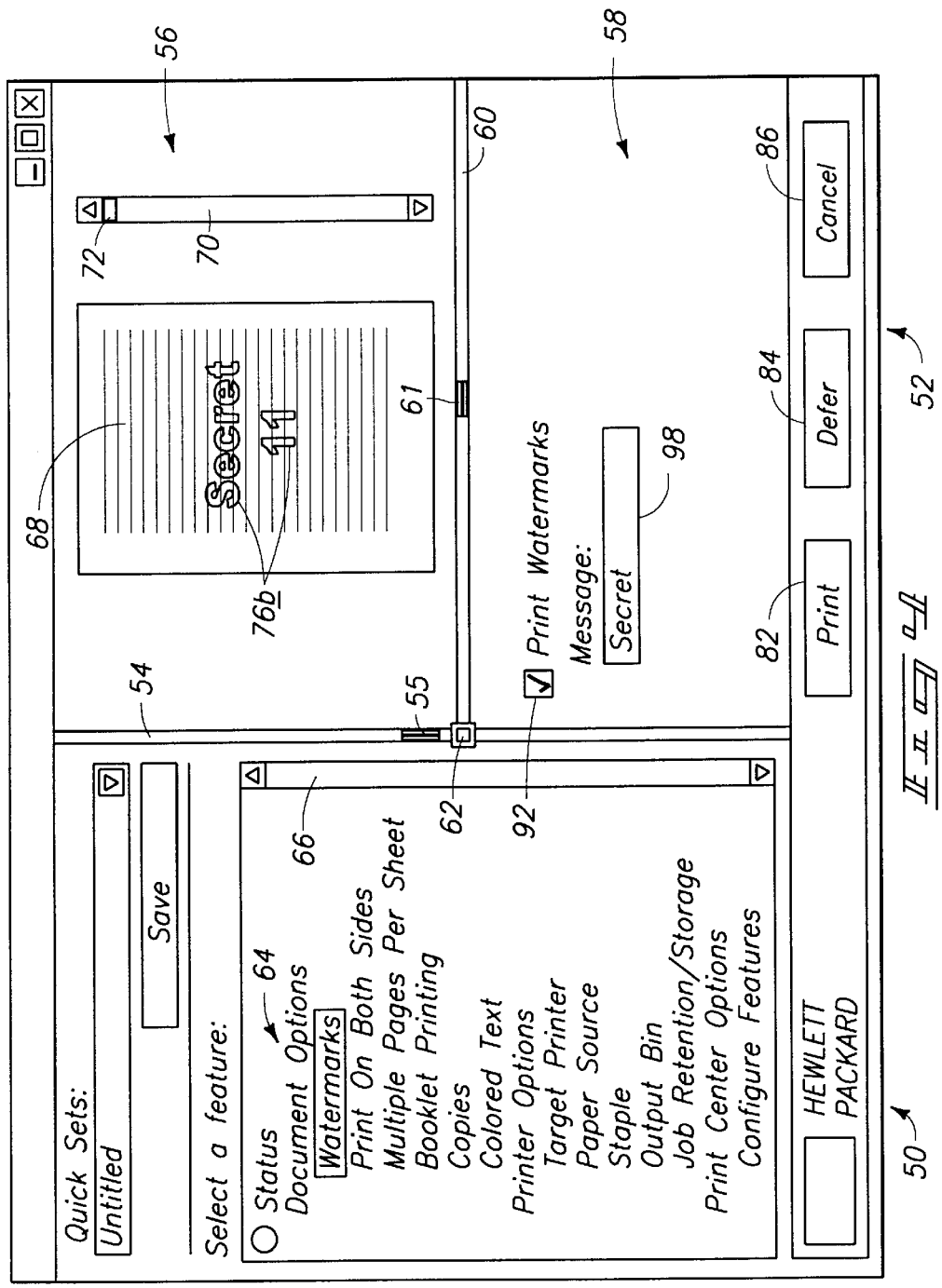

METHOD AND APPARATUS FOR INTEGRATING PRINT JOB STATUS INFORMATION AND USER OPTIONS WITH IMPLICIT JOB INTERRUPTION

FIELD OF THE INVENTION

The invention relates to printers and computer networks. More particularly, the invention relates to selection of print features.

BACKGROUND OF THE INVENTION

Over the last several decades, computer systems have become increasingly complex, and, at the same time, have been modified to provide increasing numbers of options, capabilities and customization features for specific tasks. Printer technology is a dramatic example of the increased capabilities that even modest modern computer systems offer compared to those of a few decades ago. Widespread adoption of features allowing on-the-fly modification of print parameters (e.g., font, print size, mixed graphic/text output, selection of multiple printers, paper sources etc.) permit very complex printer operations to be carried out with relative ease, compared to what is possible with older print technologies, such as those using daisy-wheel printing systems.

The increased capabilities found within modern printer systems requires increased sophistication in the commands that are sent to the printer in order to carry out the user's desired print options. In turn, the user has a larger number of options to select in composing a document to be printed. As a result, the need to be able to organize and to display printer options in a compact, organized and user-friendly fashion has grown dramatically.

Typically, a print job is sent to a printer, and the user is provided with a status dialog box. The printing software carries out preliminary processing of the print job in order to be able to send formatted pages from the print job to the printer. While the print job is being processed, the software displays the status of the print job in the status dialog box. While the status is being displayed, the user has the options of letting the printing software continue to process the print job without intervention, canceling the print job or suspending the print job temporarily while the user reviews or modifies various printing options.

When these options are presented using a status dialog box that is separate from dialog boxes used to modify the print job, the user has no idea what print features may be optionally modified, or of how those options are currently set. Prior to the print processing software beginning to send pages to the printer, the user can interrupt the process by clicking on an "Options" button. Aside from the vague clue provided by the label on the button, the user may have no idea what options may be available, or of how those options are currently set. A new user may be hesitant to explore the "Options" because it is not clear what this may lead to. Moreover, when the user does explore this setting, the user loses access to the status information.

SUMMARY OF THE INVENTION

In accordance with an aspect of the present invention, a method of integrating print job status information and user options includes displaying a list of user-selectable printing features including a status feature, with the status feature selected, in response to a command to execute a print job, and displaying a current status of the print job together with the list.

In accordance with another aspect of the present invention, an article of manufacture includes a computer usable medium having computer readable code embodied therein to cause a display to depict a graphical user interface for setting printer options. The computer readable program code in the article of manufacture is configured to display, in the graphical user interface, a list of user-selectable printing features including a status feature, with the status feature selected, in response to a command to execute a print job, and to display a current status of the print job together with the list.

In accordance with yet another aspect of the present invention, a computer implemented printer control system includes memory configured to provide an operating system and operative to store files representing at least one document to be printed and a display configured to provide an image of a graphical user interface in a viewing window. The graphical user interface is configured to allow user selection and modification of print engine options for printing the document. The control system also includes processing circuitry configured to display, in the graphical user interface, a list of user-selectable printing features including a status feature, with the status feature selected, in response to a command to execute a print job, and to display a current status of the print job together with the list.

Other features and advantages of the invention will become apparent to those of ordinary skill in the art upon review of the following detailed description, claims and drawings.

DESCRIPTION OF THE DRAWINGS

FIG. 1 is a simplified block diagram of a computer system and printer, in accordance with an embodiment of the present invention.

FIG. 2 is a simplified flowchart illustrating a process, in accordance with an embodiment of the present invention.

FIG. 3 shows a simplified view of a graphical user interface for controlling the printer of FIG. 1 using the process shown in the flow chart of FIG. 2, in accordance with an embodiment of the present invention.

FIG. 4 shows a simplified view of a graphical user interface for controlling the printer of FIG. 1 using the process shown in the flow chart of FIG. 2, in accordance with an embodiment of the present invention.

DETAILED DESCRIPTION OF THE INVENTION

FIG. 1 is a simplified block diagram of a computer system 10 and printer 12 coupled together via a bus 13, in accordance with an embodiment of the present invention. The computer system 10 includes a central processing unit (CPU) 14 that is coupled to a data and address bus 16. The data and address bus 16 is coupled to a memory system 18. The memory system 18 includes nonvolatile mass data storage device 20, which may include a CD ROM, floppy drive, hard drive, zip drive, floptical storage, optical storage, tape storage or other forms of data storage and retrieval devices known in the art. The memory system 18 also includes a read only memory (ROM) 22 and a random access memory (RAM) 24. In one embodiment, the computer system 10 includes the memory system 18 or other computer readable medium bearing software that will be described below. A display 26 and a user interface 28 are also coupled to the CPU 14 through the data and address bus 16. The computer system 10 includes I/O devices 30 coupled to the data and address bus 16 to promote data communications between the computer system 10 and external data processing and conditioning devices, including the printer 12. It will be appreciated that more complex computer systems are also used in conjunction with printers 12, however, for clarity of explanation and ease of understanding, the present invention will be described in the context of the computer system 10 of FIG. 1.

In one embodiment, the user interface 28 includes a keyboard and a cursor manipulating tactile input device, such as a mouse or a touchpad. However, it is understood that other forms of input devices can also be used including voice recognition systems, joysticks, graphics tablets, data readers, card readers, magnetic and optical readers, other computer systems etc. The user receives visual feedback via the display 26. According to one construction, the display 26 comprises a graphics display terminal, such as a CRT display or a liquid crystal display. The user enters commands and text via the user interface 28 and observes feedback from the computer system 10 using the display 26. The CPU 14 operates on data using modules composed of lines of code that typically are stored in RAM 24, in response to the commands from the user, and provides results that may be stored in the memory system 18, displayed on the display 26 or that may be communicated to other devices external to the computer system 10, such as the printer 12. The modules may or may not be defined by a subroutine separate from a main program. It will be understood that while the invention is described in terms of a computer system 10 and a printer 12, it may also be practiced in systems that include multiple computers, such as servers and the like.

FIG. 2 is a simplified flowchart illustrating a process P1 in accordance with one aspect of the invention. The process P1 begins with a step S1. In the step S1, the user supplies a print command. In a step S2, the process P1 displays a graphical user interface, shown in FIG. 3, with a "Status" feature selected from a list of user-selectable features. The graphical user interface includes a print preview image and controls for a selected feature. In a step S3, the process P1 displays the current status of the print job in the graphical user interface. In a query task S4, the process P1 determines whether the user has selected a feature other than "Status" from a list of features in the graphical user interface of FIG. 3. When the query task S4 determines that no other feature has been selected by the user, control passes to a query task S5. In the query task S5, the process P1 determines if the print job has ended. When the query task S5 determines that the print job has ended, the process P1 ends. When the query task S5 determines that the print job has not ended, control passes to the step S2 to display the graphical user interface, which is then updated in the step S3.

When the query task S4 determines that the user has selected another feature, control passes to a step S6. In the step S6, processing of the print job is interrupted. In a step S7, controls for the selected feature are displayed in the graphical user interface. In a query task S8, the process P1 determines if the user has changed a control for the selected feature. When the query task S8 determines that the user has changed a control for the selected feature, control passes to a step S9. In the step S9, the print preview image is updated in response to user changes in the controls for the selected feature. After the step S9, or after the query task S8 determines that no control has been changed for the selected feature, a query task S10 determines if the user has selected "Print." When the query task S10 determines that the user has not selected "Print," control passes to the step S7. When the query task S10 determines that the user has selected "Print," control passes to a step S1. In the step S11, the process P1 resumes processing the print job with any changes that the user has made, and the process P1 then ends.

FIG. 3 shows a simplified view of a graphical user interface for controlling the printer 12 of FIG. 1 using the process P1 shown in the flow chart of FIG. 2, in accordance with an embodiment of the present invention. FIG. 3 shows a first screen portion 50 and a second screen portion 52 separated by a first divider 54.

In one embodiment, a first affordance 55 is provided together with the first divider 54. As used herein, the term "affordance" is defined to mean a visible feature having a characteristic from which the user infers (imagines) the operation method. In the illustrated example, the first affordance 55 is formed by vertical lines resembling ridges that are intended to suggest to the user that the first divider 54 may be moved by the user. In one embodiment, an input 3 device in the user interface 28 of FIG. 1, such as a mouse, may be used to "click and drag" the first divider 54 or the first affordance 55 left or right to adjust relative sizes of the first 50 and second 52 portions. In one embodiment, the second screen portion 52 is separated into a first sub portion 56 and a second sub portion 58 separated from one another by a second divider 60 having a second affordance 61.

A third affordance 62 is formed by the intersection of the first 54 and second 60 dividers. In the illustrated examples, the third affordance 62 is denoted by a square positioned at a junction of the first 56 and second 60 dividers. Relative sizes of the first 50 and second 52 portions, as well as the first 56 and second 58 sub portions, may be simultaneously adjusted by a user by clicking on and then dragging the third affordance 62 in any direction.

A list 64 of printer features is displayed in the first portion 50, together with a scroll bar 66. This allows the user to rapidly scan features in the list 64 and to select features in the list 64 for modification from their default settings, using, for example, a mouse-driven cursor. When the user selects a feature from the list 64, that feature is shown in a first visually distinct manner in the list of features 64. Selection of a feature from the list 64 will cause the controls displayed in the second sub portion 58 to change to the controls appropriate for the feature that is currently selected.

The first sub portion 56 displays a print preview image 68. The first sub portion 56 also displays a scroll bar 70 together with a scroll button 72. The scroll bar 70 allows the user to select a specific page in the document for the print preview image 68, using, for example, a mouse-driven cursor. The print preview image 68 shows the selected page as it will appear when it is printed.

Status of the print job is shown in a display 74 contained within the second sub portion 58. In the example of FIG. 3, page 12 is being received. A status message 78 is shown below the display 74. In one embodiment, the graphical user interface of FIG. 3 is displayed for an interval that is set by a predetermined delay. The interval is intended to allow the user opportunity to see the list of features 64. In one embodiment, the interval may be 15, 20 or 30 seconds. In one embodiment, the interval is user-adjustable and the user may select any interval of from 0 to 10 minutes. A remaining portion of the predetermined delay may be indicated by a pie chart display 80.

The graphical user interface also includes buttons 82, 84 and 86, labeled "Print," "Defer" and "Cancel." The user may select the "Print" button 82 in order to re-start the print job via steps S10 and S11. Alternatively, the user may elect to defer printing by selecting the "Defer" button 84 or to cancel printing by selecting the "Cancel" button 86. The status message allows the user to bypass the predetermined delay by selecting the "Print" button 82 to begin printing immediately.

FIG. 4 shows a simplified view of a graphical user interface for controlling the printer 12 of FIG. 1 using the process P1 shown in the flow chart of FIG. 2, in accordance with an embodiment of the present invention. In the example of FIG. 4, the user has selected the "Watermarks" feature from the list 64 in the step S4. The print preview image 68 includes a watermark 76b displaying the legend "Secret" as it will appear when it is printed. In the example of FIG. 4, the user has set the "Watermarks" feature to "Secret" using a user-editable text box 98 in the step S8. When the user selects the print button 82 in the step S10, the print job is re-started.

Advantages to the graphical user interface system illustrated in FIGS. 3 and 4 include providing the status of the print job together with a list of features that may be applied to the print job. The user is provided an opportunity to modify features of the print job and to see, using the print preview image 68, what the print job will look like. The print features are clearly displayed, rather than being hidden behind a label such as "Options." The user is also provided with flexibility in determining when the print job is executed. The inconvenience of a status dialog box that obscures print features and a print feature dialog box that obscures print job status is eliminated. The user has access to the status of the print job while exploring the list of print features 64. The print job is suspended automatically while the user explores the available print features, and resumes automatically when the user selects the "Print" button 82. When the user doesn't select any print features for modification, the print job executes automatically following a predetermined delay, avoiding unnecessary delay in the event that the user has, for example, gone for coffee while the print job is being executed.

The protection sought is not to be limited to the disclosed embodiments, which are given by way of example only, but instead is to be limited only by the scope of the appended claims.

What is claimed is:

1. A method of integrating print job status information and user options comprising displaying a list of user-selectable printing features including a status feature, with the status feature selected, in response to a command to execute a print job, displaying a current status of the print job together with the list, receiving a selection of one of the user-selectable printing features other than the status feature, interrupting the print job in response to receiving the selection, and displaying a user-actuable control for the selected one of the features.

2. The method of claim 1, further comprising displaying a print preview image which changes in response to actuation of the user-actuable control.

3. The method of claim 1, further comprising displaying a print preview image which changes in response to actuation of the user-actuable control, receiving a second command to execute the print job and resuming the print job in response to the second command.

4. The method of claim 1, further comprising modifying the print job in response to user actuation of the user-actuable control.

5. The method of claim 1, further comprising modifying the print job in response to user actuation of the user-actuable control, receiving a second command to execute the print job and resuming the print job in response to the second command.

6. The method of claim 1, further comprising displaying a print preview image which changes in response to actuation of the user-actuable control and receiving a second command to execute the print job.

7. An article of manufacture comprising a computer usable medium having computer readable code embodied therein to cause a display to depict a graphical user interface for setting printer options, the computer readable program code in the article of manufacture being configured to display, in the graphical user interface, a list of user-selectable printing features including a status feature, with the status feature selected, in response to a command to execute a print job, to display a current status of the print job together with the list, to receive a selection of one of the user-selectable printing features other than the status feature, to interrupt the print job in response to receiving the selection, and to display, in the graphical user interface, a user-actuable control for the selected one of the features.

8. The article of manufacture of claim 7, the computer readable program code further being configured to display, in the graphical user interface, a print preview image which changes in response to actuation of the user-actuable control.

9. The article of manufacture of claim 7, the computer readable program code further being configured to display, in the graphical user interface, a print preview image which changes in response to actuation of the user-actuable control, receive a second command to execute the print job, and resume the print job in response to the second command.

10. The article of manufacture of claim 7, the computer readable program code further being configured to the print job in response to user actuation of the user-actuable control.

11. The article of manufacture of claim 7, the computer readable program code further being configured to modify the print job in response to user actuation of the user-actuable control, receive a second command to execute the print job, and resume the print job in response to the second command.

12. The article of manufacture of claim 7, the computer readable program code further being configured to display, in the graphical user interface, a print preview image which changes in response to actuation of the user-actuable control, and receive a second command to execute the print job.

13. A computer implemented printer control system comprising:
   memory configured to provide an operating system and operative to store files representing at least one document to be printed;
   a display configured to provide an image of a graphical user interface in a viewing window, the graphical user interface configured to allow user selection and modification of print engine options for printing the document; and
   processing circuitry configured to display, in the graphical user interface, a list of user-selectable printing features including a status feature, with the status feature selected, in response to a command to execute a print job, to display a current status of the print job together with the list, to receive a selection of one of the user-selectable printing features other than the status feature, to interrupt the print job in response to receiving the selection, and to display, in the graphical user interface, a user-actuable control for the selected one of the features.

14. The printer control system of claim 13, wherein the processing circuitry is additionally configured to display, in the graphical user interface, a print preview image which changes in response to actuation of the user-actuable control, receive a second command to execute the print job and resume the print job in response to the second command.

15. The printer control system of claim 13, wherein the processing circuitry is additionally configured to modify the print job in response to user actuation of the user-actuable control.

16. The printer control system of claim 13, wherein the processing circuitry is additionally configured to modify the print job in response to user actuation of the user-actuable control, receive a second command to execute the print job, and resume the print job in response to the second command.

17. The printer control system of claim 13, wherein the processing circuitry is additionally configured to display, in the graphical user interface, a print preview image which changes in response to actuation of the user-actuable control, and receive a second command to execute the print job.

* * * * *